May 14, 1935.  H. N. SHAW  2,001,219
HEATING DEVICE
Filed July 1, 1933   3 Sheets-Sheet 1

INVENTOR.
Harold N. Shaw.
BY
Morsell Lieber & Morsell
ATTORNEYS.

May 14, 1935. H. N. SHAW 2,001,219
HEATING DEVICE
Filed July 1, 1933  3 Sheets-Sheet 2

INVENTOR.
Harold N. Shaw
BY
Morrell Lieber & Morrell
ATTORNEYS.

May 14, 1935.  H. N. SHAW  2,001,219
HEATING DEVICE
Filed July 1, 1933  3 Sheets-Sheet 3

INVENTOR.
Harold N. Shaw
BY
Morsell Kiehm & Morsell
ATTORNEYS.

Patented May 14, 1935

2,001,219

UNITED STATES PATENT OFFICE 2,001,219

HEATING DEVICE

Harold N. Shaw, Erie, Pa.

Application July 1, 1933, Serial No. 678,581

26 Claims. (Cl. 219—47)

This invention relates to improvements in heating devices.

In my former Patents Nos. 1,507,005 and 1,739,617 there are disclosed induction heaters particularly adapted for use in connection with containers in which a current is caused to flow in the container or other object to be heated to raise the temperature thereof for cooking or other purposes. The present invention, among other features, contemplates certain improvements over the devices disclosed in the above-mentioned patents.

One of the objects of the present invention is to provide a device of the class described wherein heavy electric currents are passed through extensions cast integral with a container or other object to be heated.

A further object of the invention is to provide an improved method of casting iron inserts, preferably laminated, into said extensions, said inserts being for the purpose of carrying a magnetic flux.

A further object of the invention is to provide an induction heater having an accurate inductor ring and a primary coil for producing the flux and for inducing current into the container extensions, wherein said inductor ring is formed of laminated iron preferably secured together by welding.

A further object of the invention is to provide in a device wherein the primary coil and secondary extensions are carried by separable members, means for equalizing the forces which tend to thrust the secondary extensions away from the primary coil and means for accurately centering the secondary extension ring in the inductor ring.

A further object of the invention is to provide a device of the class described wherein the iron inserts which are cast into the container extensions are of spiral construction to provide novel laminated armatures.

Other objects of the invention are to provide a heating device having means for securely maintaining the primary coil in position with respect to said inductor ring; means for preventing the primary coil from overheating; means for controlling the temperature of the container or other object to be heated; means for causing effective distribution of the heat in the container; means for directing the flow of current in the container extensions; an improved method of forming the inductor ring to accurate size; and means in the container forming a trough to receive sediment from the article being cooked, said trough being located below the level of the heating surface.

With the above and other objects in view, the invention consists of the improved heating device and all its parts and combinations as set forth in the claims, and all equivalents thereof.

Referring to the drawings.

Figures 1, 3, 4:
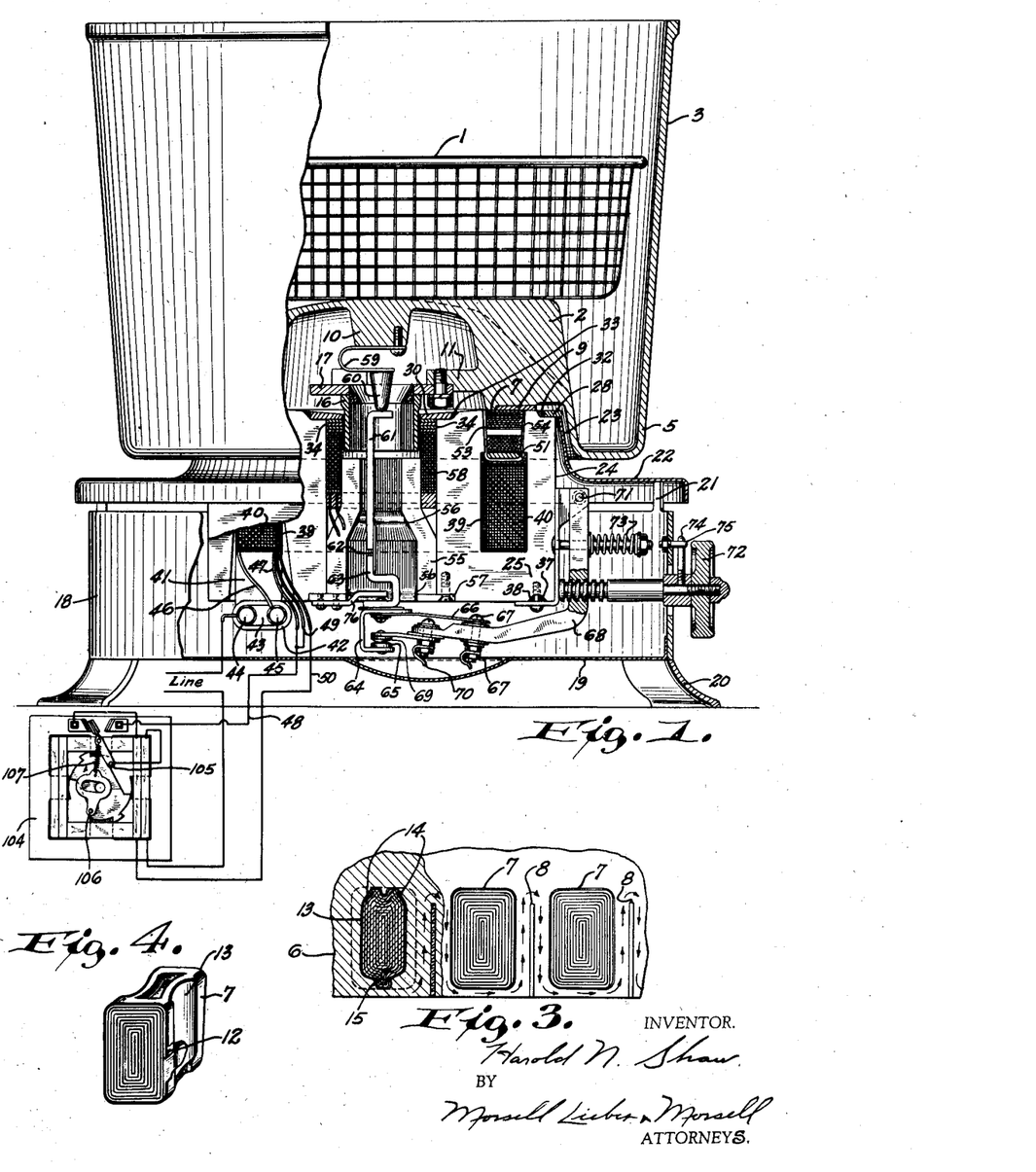
Fig. 1 is an elevational view of the improved device, part being broken away and shown in vertical section.
Fig. 3 is an enlarged fragmentary view looking at the side of the container extension, part being broken away and shown in section to bring out the armature construction.
Fig. 4 is a perspective view showing one of the armature inserts.

Referring to the drawings, the device illustrated in Fig. 1 shows the invention applied to a utensil adapted particularly for deep fat frying but which may be used for roasting or baking when empty, and for steaming vegetables when a small quantity of water is poured into the sediment trough surrounding the heating dome. A cover may be used when roasting or baking is being performed. The numeral 1 designates a basket into which food may be placed and said basket is adapted to rest on a dome 2 projecting from the bottom of the container 3, the latter being preferably of cast aluminum. The dome is preferably formed with radial ribs 4 to increase the area of the heating surface in contact with the fat, liquid or air in the container and thereby reduce the temperature difference between said surface and said fat, liquid or air. The metal of the heating dome, between the secondary circuit (to be hereinafter described) and the ribs serves to distribute the heat evenly with a small drop in temperature, due to the high conductivity of the solid metal casting forming said dome.

The container 3 is provided with an annular depending portion 5 which forms a trough around the heating dome projecting below the bottom thereof. This provides a receptacle for sediment, which due to its position, is relatively cool to thereby prevent agitation of the sediment while the fat is being heated.

Projecting from the bottom of the dome 2 substantially the same distance as the trough 5 projects, and spaced inwardly therefrom, is an annular extension 6 cast integral with the container (see Figs. 1, 2 and 3), and a plurality of armatures 7 spaced apart and separated from one another by sections of mica or other insulating material 8 are cast in the annular extension 6 in the manner shown in Fig. 3. The exact method of procedure in connection with this casting will be hereinafter referred to. The extension 6 and armatures 7 form the secondary circuit of the device. Support pads 9 of non-magnetic hard metal are secured to some of the armatures, preferably three of them one hundred and twenty degrees apart, and are cast in position as shown.

The center of the dome 2 is hollow as indicated in Fig. 1 and the dome is formed with a boss 10 depending into the hollow space and with laterally extending lugs 11. The said boss is so positioned as to follow sudden changes in temperature of the container contents for a purpose to be hereinafter described.

The armatures 7 shown separately in Fig. 4, are formed of elongated strips of electrical steel, the said strips having opposite longitudinal edges folded over as at 12. The strips are rolled on a slotted mandrel to a spiral form and flattened to the form illustrated and the folded over edgs form a double thickness at the ends of the spiral. In order to prevent unwinding, a sleeve 13, of tin or other suitable material, or a catch may be employed. A tin sleeve presents a desirable surface for casting in without blow holes. Unwinding of the spiral may also be prevented by doing the winding in a flattening die, and squeezing it flat with the mandrel removed, but with the sides of the die preventing unwinding. The flattening die also squeezes the center of the armature smaller than the ends so as to allow more space for metal on the extensions 6 to be cast between the armatures and the insulating separators 8. The squeezing also renders the armatures very solid and eliminates vibration due to magnetic forces. The upper side edges are beveled off in the die as at 14 in Fig. 3 and the lower side edges are squeezed to a narrow ridge as at 15 to insure a solid casting over the armatures. After squeezing, the armatures are upset in the die to form the exact curvature and draft shown and the exact length as well. The finished armature is then almost as rigid as solid metal due to the wrinkles which are formed in upsetting interlocking with one another. The scale on the steel used for the armature spiral prevents serious short circuiting of the turns of the spiral so the magnetic flux penetrates to the center as in a laminated core.

A centering pin 16 is welded to a ring 17 and the latter is in turn bolted or otherwise secured to the lugs 11 on the inside of the heating dome. The centering pin is trued up by a hollow mill guided by a jig set over the secondary ring or extension 6. The jig also serves to check any inaccuracies of high spots on the secondary ring.

The base 18 may be of circular form as shown and may have a bottom 19 and legs 20. Lugs 21 projecting upwardly from the upper edge support a top piece 22 in slightly spaced relation. The said top is formed with a circular opening defined by an annular upstanding flange 23.

Figure 2:
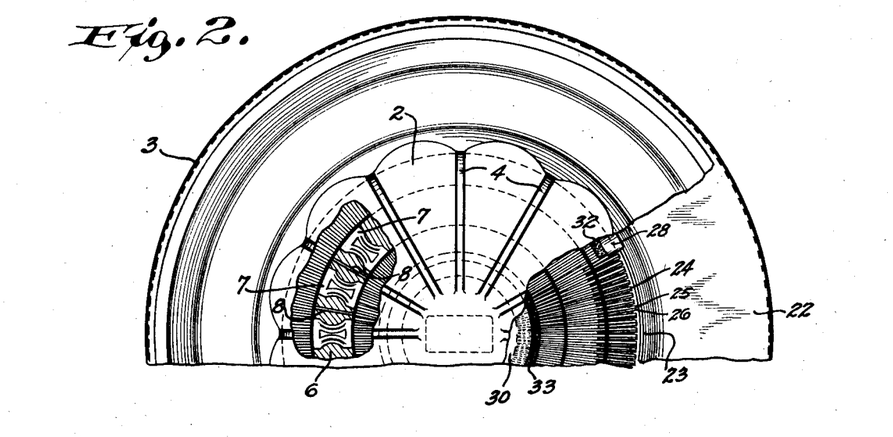
Fig. 2 is a fragmentary plan view thereof, parts being broken away and parts being shown in section.

The inductor ring designated generally by the numeral 24 is positioned within the base with its top in substantial alinement with the upper edge of the annular flange 23. This ring is composed of a plurality of flat U-shaped punchings 25 (see Fig. 5) arranged in ring formation as shown in Fig. 2. In view of the fact that the inner circumference of the ring is small compared to the outer circumference, extra I-punchings 26 (see Fig. 6) are inserted between the outer legs of the U-shaped punchings. As the I-punchings do not always fill the space between the U-punchings, bosses 27 (see Fig. 7) are raised on the I-punchings at several points near the outer edge to provide a solid stack forming a true circle. Bosses 27', (see Fig. 5) are raised on alternate U-punchings to insure accurate spacing of the outer edges of the inner legs.

The laminations or U and I-punchings, are assembled on a ring jig the exact size of the groove necessary for proper clearance of the secondary extension 6. Clamps secure the laminations to the jig, and also hold an outer band 28 in position in an outer peripheral groove formed by the cut-outs 29 of the U- and I-punchings, and hold an inner washer 30 in position in an inner peripheral groove formed by the cut-outs 31 of the U-punchings. The band 28 and washer 30 are welded in position as at 32 and 33 respectively. Below the washer 30 are a plurality of other washers 34 which are machined to cause a close fit so that the shrinkage of the inner weld will contract on them and not decrease the inside diameter of the groove to any serious extent. The draft 35 and 36 of the air gap face of the inductor ring allows easy removal from the jig after the outer weld has shrunk the punchings on the jig. The lower part of the punchings should be cooled by immersion in water while the welding is being accomplished to prevent warping due to unequal shrinkage strains. A lower weld 37 in the recesses 38 serves to secure the lower ends of the I-punchings.

The primary coil may comprise an inner section 39 and an outer section 40 and is formed of asbestos wound or other insulated wire preferably impregnated with a suitable material such as China-wood oil and then baked at its maximum working temperature, usually around 500° F. The coil may be baked before or after being secured in place. The coils are wound in the lower part of the groove formed in the inductor ring as shown. The several sections of the coil are of different gauge wire.

A strip of copper 41 or other good heat conductor extends through a space between laminations of the inductor ring and is preferably bent to extend horizontally between the bottom of the coil and the bottom of the inductor ring groove. The lower end of the copper strip is separated by mica 42 or other electrical insulating material which will permit heat to pass, from a fuse strip 43 connecting two terminals 44 and 45. A lead 46 from the outer coil 40 connects with the fuse terminal 45. The other terminal 44 is connected with the line. The other lead 47 from the outer coil connects with a conductor 48 and the latter is also connected with one lead 49 of the inner coil. The other lead of the inner coil connects with a conductor 50. The fuse strip 43 is designed to melt at the maximum safe coil temperature and disconnect the power supply before the coil can be damaged by accidental overheating.

The primary coils are surrounded by suitable insulation and are held in place by a snap ring 51 of high resistance metal which spreads and catches below the shoulders 52 of the U- and I-punchings.

When the container is in position as shown in Fig. 1, the annular secondary extension 6 fits in above the snap ring as shown. The air gap 53 between the inner face of the armatures of the secondary should be sufficient for clearance when the utensil is cold and the outer air gap 54 should be sufficient for clearance when the utensil is hot as the utensil ring and inductor ring do not expand alike. The draft 35 and 36 (see Fig. 5) insures easy removal of the secondary ring.

In the center of the inductor ring are a plurality of Z-shaped punchings 55 arranged in circular formation by assembly in a jig and welding as at 56. The assembly is held in position by a lower washer 57 and forms the core for a coil 58 mounted on its upper end. The coil is connected in series with the primary coil and produces a magnetic flux across the air gap between the centering pin 16 and the coil core. The pull of this flux must counteract the upward thrust exerted between the primary coil and the secondary circuit. The washers 34 above the pull coil are split to prevent excessive induced currents interfering with the free passage of the magnetic flux to the centering pin 16. The pin is formed of a spiral of electrical steel welded to the inside of a pipe and the pipe is machined down to a thin wall. The lowest washer may be of non-magnetic material.

The washers 34 are cut out and tapered outwardly and downwardly slightly by an end mill guided by a jig fitting the inductor ring. The clearance between the lower washers 34 and the centering pin is small so as to insure an equal air gap between the armatures and the inductor ring all around, this resulting in a balance of the air gap forces between the armatures and the inductor ring.

Figures 5, 6, 7, 11, 12, 13, 14:
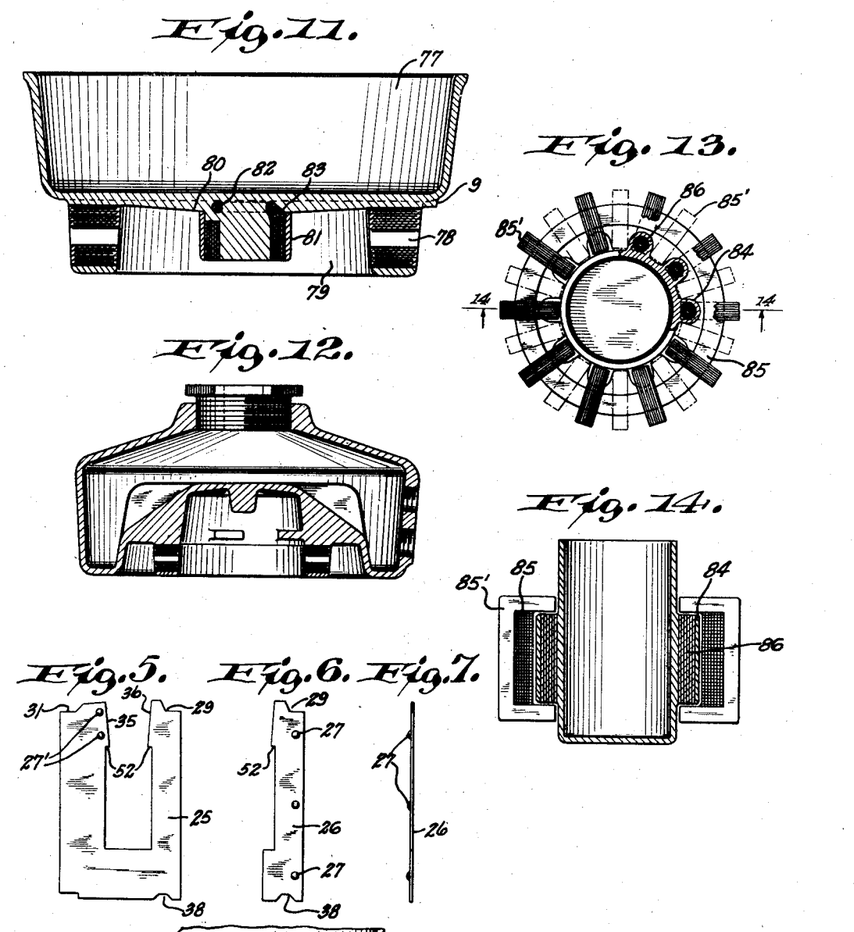
Fig. 5 is an elevational view of one of the U-members used in forming the inductor ring.
Fig. 6 is a similar view showing one of the I-shaped filler pieces.
Fig. 7 is an edge view of the filler.
Fig. 11 is a vertical sectional view of another type of container.
Fig. 12 is a vertical sectional view showing the application of the invention to a water or oil heater.
Fig. 13 is a plan view of a modification wherein the invention is applied to a cup-like receptacle or pipe.
Fig. 14 is a sectional view taken on line 14—14 of Fig. 13.

With the air gap forces balanced by the centering pin and the coil thrust balanced by the pull coil force, all objectionable vibration and noise is eliminated and a high power unit for rapid and efficient cooking becomes practical, with the utensil free at all times. The non-magnetic support pads 9 in connection with the utensil bottom insure that the utensil rests solidly on the inductor ring and prevent rocking vibration under slightly unbalanced forces. The three support pads 9 may be of cast aluminum as shown in Fig. 11, to insure rigidity. With large air gaps, it may be necessary to reduce noise, by means of an extra coil over the pull coil, connected in series with a condenser to provide a leading current to neutralize the lagging magnetizing current.

For low power applications, the pads 9 may be enlarged and formed of iron to thereby serve as magnets and exert a pull down force on the secondary. When so used the coil 58 may be eliminated. In this application, it is necessary to locate the pads between armatures and over the separators 8. The secondary current will then be forced around the pads and the pull of the latter will be in phase with the coil thrust.

Secured to the bottom of the boss 10 of the receptacle is a thermostatic member 59 having a knob 60 carried by its free lower end. When the member 59 bends downwardly as a result of a rise in temperature, the knob 60 depresses an L-shaped member 61. The lower end of the latter is connected by a flat spring 62 with a U-piece 63. The piece 63 is connected to a second U-piece 64 and is electrically insulated therefrom. A silver contact 65 is carried by the lower arm of the U-piece 64 and the upper arm is connected by a strip spring 66 with a binding post 67 on an L-shaped lever 68. The other silver contact 69 is mounted on the free end of a strip connected to the other binding post 70 of the lever 68. The latter is pivotally mounted at a relatively high point as at 71, and its normal position may be varied by an adjustment member 72 operating against the tension of a spring 73. Turning of the adjustment wheel causes vertical motion of the top of the member 61, there being, however, a slight side play.

It is obvious that when the thermostatic member 59 is subjected to temperature above a predetermined point that there will be separation of the silver contacts 65 and 69. The adjustment member 72 may be formed with a pointer 74 indicating positions on a temperature scale. A stop 75 may also be provided to limit the turning movement. A limit strip 76 extending into the U-piece 63 maintains the contacts open when the adjustment wheel is turned to a predetermined (room temperature) position, so that the current is shut off when the kettle is removed. The thermostat, therefore, also serves as a line switch. It is important that the contacts 65 and 69 be in the line of motion of the knob 60 to insure positive movement of said contacts. The contacts 67 and 70 of the thermostat are connected in series with the coils 40 and 58 and the line.

In Fig. 11 there is illustrated a modified form of utensil 77 for use with a base similar to that of Fig. 1. Armatures 78 similar to the armatures of Fig. 1 are cast into an annular extension 79. The bottom of this utensil is preferably somewhat thicker as at 80 to prevent vibration and when so formed, the inductor ring of the base should be dished as shown in Fig. 1. The centering pin 81 is locked rigidly to the casting by shrinkage of the metal around the lock ring 82. Welding is also performed at several points as at 83. Other types of shrink locking may be employed to accomplish the same result. A hole may be provided in the center of the hard sand core to hold the centering pin. Fig. 12 illustrates how the general design may be applied to an automatic water heater. No pull coil is necessary in this case as the parts are permanently clamped together.

Figs. 13 and 14 illustrate an application wherein the secondary 84 comprises a plurality of spaced extensions which surround the side of a cup or the like, and wherein the primary 85 embraces the secondary. The secondary can be removed by turning the cup to the dotted line position shown in Fig. 13 so that the U-members 85' are between the secondary extensions 84. In this design spiral armatures 86 may be forced into holes drilled in the cast extensions 84. The primary coil surrounding the secondary extensions neutralizes the coil thrust.

Figure 15:
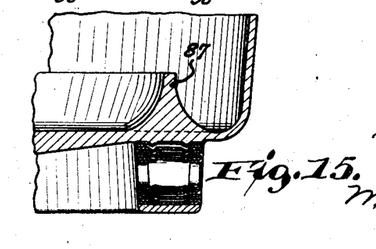
Fig. 15 is a fragmentary vertical sectional view showing another modification.

Fig. 15 illustrates a fragment of another modification wherein a circular rib 87 projects upwardly from the bottom of the container above the secondary ring. This may be used in cases where the radial ribs 4 of Fig. 2 are not necessary, but where the surface of the utensil bottom will not alone provide sufficient heating area.

Figure 8:
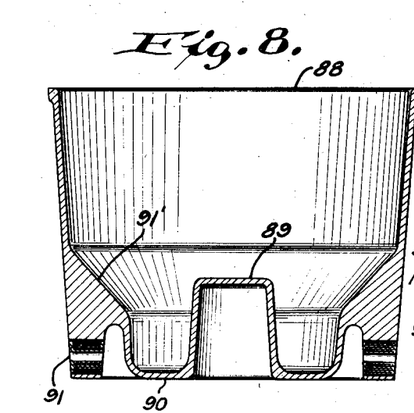
Fig. 8 is a vertical sectional view of a modified form of container.

In Fig. 8 a modified form of fry kettle 88 is illustrated wherein there is a central thermostat dome 89 surrounded by a sediment trough 90, the latter being surrounded by a relatively large secondary ring or extension 91. In this form of the invention it is practical to employ a wire heating element or a gas burner in an inverted trough provided in lieu of the secondary ring. The heating surface 91' slopes into the sediment trough 90.

Figure 9:
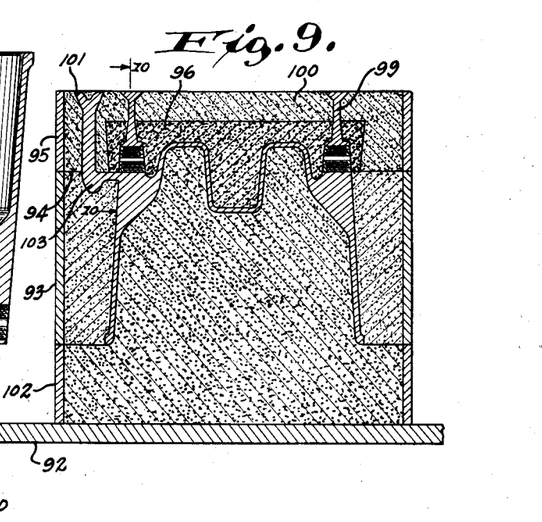
Fig. 9 is a vertical sectional view showing the method of forming the container and of casting the iron inserts into extensions thereof.
Figure 10:
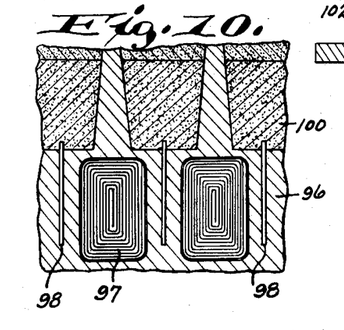
Fig. 10 is an enlarged detail view taken on line 10—10 of Fig. 9.

The method of casting the iron armature members in position in the aluminum secondary ring has been shown in Figs. 9 and 10, the form of utensil of Fig. 8 being used for purposes of illustration. In carrying out the method, the pattern is placed on a molding board 92 upside down and the cheek box 93 is placed over it. Sand is then packed between the sides of the pattern and the box. The sand is then scraped off level with the top of the box at the upper parting 94 and parting powder sprinkled on to prevent the cope sand adhering to the cheek sand. The cope box 95 is then placed on the cheek box and the core 96, with the armatures 97 and separators 98 in place, is set over the pattern bottom as shown. The armatures and separators are set into a circular groove in the baked hard sand core and this groove has the exact draft and curvature of the finished ring so that the armatures fit snugly and require little adhesive to hold them in place. The separators are cut to the exact draft and width of the ring and extend into slots in the bottom of the groove in the core as shown to prevent the secondary circuit being shorted over them in the finished ring. The core with the armatures and separators in place is maintained in position while casting by the sand of the mold. Risers 99 over each armature are desirable to prevent blow holes. The cope is then packed with sand as at 100, and the feeder hole 101 is cut in as shown. For large castings, two feeders on opposite sides are used. The mold is then turned over and the drag box 102 placed on top, in place of the board 92. Parting powder is spread on the cheek sand and the drag box and pattern are packed with green sand. The board is then replaced and the mold turned over again. The riser forms are then pulled out of the sand and the cope box with the core is carefully removed. The tapered sides of the core prevent its falling out, but in some cases it is necessary to use wires in the sand to hold the core solid, as in standard foundry practice. With the cope removed, the pouring sump 103 and lateral feeder are cut in the sand. The cheek box 93 is then carefully raised off the pattern. Then the pattern is lifted off the drag mold, and the cheek and cope replaced. The mold is then ready for pouring, and the hot metal, usually aluminum, flowing around the armatures carries any gases formed, up into the risers.

The armatures may be cast into a die casting or permanent mold casting as well as into a sand casting. The method of casting in the armatures makes possible a low cost yet accurate secondary ring on any type of utensil or plate, there being no necessity for machining.

In Fig. 1 there is shown wired in connection with the device, a switch 104 the operation of which is fully described in my Patent No. 1,533,770. This switch may be used in lieu of the thermostat 59 and is adapted to automatically maintain a constant secondary circuit temperature, within certain limits, inasmuch as whenever the temperature rises to a desired maximum the coils 39 and 40 will be connected in series by operation of the switch, thus reducing the amount of heat generated, and whenever the temperature falls to a predetermined minimum the coil 40 will be connected direct to the power supply thereby increasing the current consumed and the amount of heat given off.

The only important difference between the switch illustrated and that of the above referred to patent is in the use of a snap action. This results from the pivots 105 and 106 moving to opposite sides of the center line during operation of the switch causing the spring 107 to move the switch arm positively from one contact to the other just after the pivots pass over the center line. This snap action, independent of the rotor of the switch, is necessary in controlling the induction heater as the power must be off while the switching from high to low is taking place, to prevent short circuiting of the primary coils. When the power is off, the forces on the rotor drop to zero.

A thermostatic strip may be mounted on the secondary ring to control its temperature rather than to control the temperature of the utensil bottom. With either this control, or the control of the switch 104, the rate of boiling water in the utensil can be varied by setting the control at a temperature below the normal operating temperature of the secondary ring. The latter temperature may be as much as 150° F. higher than the temperature of the utensil bottom depending upon the design, the power consumption, and the thermal conductivity of the cast metal.

The support pads 9 shown in Fig. 1 may be bent up slightly at the outer ends to lower the armatures 7 below the top of the inductor ring. This produces an upward pull on the armatures which opposes the downward pull on the centering pin produced by the magnetizing current, the latter being out of phase with the coil thrust caused by the load current. This upward pull on the armatures also opposes the downward pull due to the draft 35 and 36 of the air gap faces.

It is evident that the armatures shown in Fig. 4 may be round, oval or square as well as rectangular. Round armatures can be rendered rigid by upsetting them on end in a die without squeezing from the sides. Rectangular armatures having the short side vertical are desirable where a low utensil ring is preferred. In some cases it is necessary to eliminate the folded edges 12 of the armatures. This will produce a larger cross-section of iron. When the fold is eliminated the iron strip may be wound with a strip of asbestos paper as a spacer, the asbestos also serving as an insulator between turns. With asbestos insulated armatures driven into the groove in the inductor ring a low cost rigid shell type magnetic circuit is provided. With a secondary coil taking part of the primary coil space, a simple low cost transformer is provided which may be used as either a step down or step up device, the same as in conventional power transformers.

Where no draft is necessary such as the draft 35 and 36 of the inductor ring, the armature may be built up of horizontal flat laminations, making possible the use of circular punchings with all the armatures joined at the inner end. Vertical laminations may be used to build up the armatures where a circular face is not necessary. With the armatures joined at the inner end, they may be hung as a unit in the sand for casting in, thereby eliminating the hard sand core.

The drawings illustrate the primary coil of greater height than width. While the leakage reactance is lower in a square coil or in a coil where the height is less than the width, a narrow coil as illustrated is desirable as it reduces the weight of the secondary ring. A low secondary ring would weigh less, but a large cross-section of iron is necessary in order to make it possible to employ a primary coil having few turns, this being essential for low coil thrust and low cost. A power factor of ninety percent is readily obtained with a commercial design.

Fig. 1 of the drawings illustrates a coil of fine wire 39 inside of the main coil 40 of the primary, the coil 39 being connected in series with the primary coil for low power. Full, one-quarter and one-sixteenth heats are then possible with a low heat coil such as the coil 39 having the same turns as the main coil 40. Full heat may be obtained on 220 volts, and one-quarter on 110 volts and one-sixteenth on 110 volts with the low coil 39 in series. This extreme low heat is desirable for economical simmering when the high heat is around three kilowatts. The paralleling of two halves of the primary coil on 110 volts may be employed where 220 volts is not available. More than three heats can be made available by means of taps on the coils, and any desired low heat can be obtained by varying the number of turns on the low coil 39.

The height of the separators 8 between the armatures determines the rating of the secondary ring with a given primary coil. Utensils having separators of different height may be used on the same inductor ring and the power consumption will vary with the utensil used. Square, rectangular or oval utensils may also be used.

This type of secondary ring may be applied to any size or shape of container or plate as illustrated in Figs. 8, 11, 12 and 15, and may be brazed or otherwise secured to the utensil instead of being cast in one piece. An inductor ring of relatively wide U-segments of cast electrical steel may be used where low iron loss is not important.

The construction of the inductor ring and the secondary ring makes possible a high wattage unit at low cost as no machining is required, and the assembly is relatively simple. The primary coil need not be over ninety-five percent efficient as the heat developed in it is largely absorbed by the utensil by radiation and conduction.

The inner legs of the U-punchings shown in Fig. 5 are wider than the outer legs as the I-punchings shown in Fig. 6 double the iron section on the outside of the inductor ring.

A drain can be provided for the groove in the inductor ring, but is not ordinarily utilized as the groove can be easily wiped clean.

The magnetic pull pin 16 described can be used to hold a primary coil and a short-circuited secondary plate together when a design similar to a constant current transformer is used for baking waffles or the like.

By only partially flattening the folds 12 on the ends of the armatures of Fig. 4 less than fifty percent space factor in the center of the spiral is available. This might be desirable for applications where less iron section is necessary.

In some applications it is possible to reduce the coil thrust to less than the utensil weight and in this case the use of the pull coil 58 is not necessary.

The insulating separators 8 in the secondary ring act as expansion joints when the heavy current heats the part of the secondary circuit close to the primary coil to a temperature higher than the part at the end of the separators. This eliminates the danger of the casting breaking over the armatures. The pipe shell of the centering pin 16 may be slit down from the top to within a short distance of its lower end to prevent induced currents where the flux is passing into the pin. The solid lower end of the pin will prevent distortion in use.

When the device is to be used for frying purposes, potatoes or other articles to be cooked are placed in the wire basket 1 and the utensil 3 is filled with the usual cooking oil. With the primary coils 39 and 40 connected to a source of electrical supply, an induced current is created within the secondary extension 6 on the utensil bottom. This is created by the magnetic flux which travels around the inductor ring 24, across the air gaps 53 and 54, through the armature members 7 and back around the U-punchings of the inductor ring. The secondary current travels through the container extension 6 in the manner indicated by arrows in Fig. 3, it being necessary for the current to travel around the ends of the mica separators 8. This results in a zig-zag course for the secondary current which produces very efficient heating in the container bottom. If the temperature of the primary coils becomes dangerously high, this heat will be conducted by the copper strip 41 to the fuse strip 43 causing melting of the latter and disconnection of the power supply before the coils can be damaged by accidental overheating. If the thermostatic member 59 is employed this will, as before described in detail, regulate the supply of current to maintain a desired temperature in the heating dome of the utensil. If the switch 104 is utilized instead of the thermostat, it will, as before outlined, operate in connection with the circuit to the primary coils to cause an increase or decrease in the amount of heat generated by said coils.

If contacts 65 and 69 are reversed and strip 59 is formed to bend down as it cools, then the strain of the pull coil will help to provide a positive connection as soon as the contacts close. A thermo strip attached to dome 89 in Fig. 8 similar to strip 59 of Fig. 1 will prevent overheating of surface 91' due to their close thermal relation through the thick bottoms of trough 90.

From the above it may be seen that the improved induction heater is constructed in such a manner as to provide for the maximum efficiency, with relatively high power consumption. In the course of developing this device, many different designs were tested and the drawings show only the types found most practical, but the claims are intended to cover other forms embodying the same general features.

What I claim is:
1. An electrical heating device comprising a primary coil connectable with a source of electrical supply, a secondary circuit forming a heating element, and an inductor ring including laminated members arranged in circular formation, each laminated member being radially disposed to present continuous circular inner and outer concentric air gap faces.

2. An electrical heating device comprising a primary coil connectable with a source of electrical supply, a secondary circuit forming a heating element, and an inductor ring including U-shaped laminated members arranged in circular formation, each laminated member being radially disposed to present continuous circular inner and outer concentric air gap faces.

3. An electrical heating device comprising a primary coil connectable with a source of electrical supply, a secondary circuit forming a heating element, an inductor ring including U-shaped laminated members arranged in circular formation to present continuous circular inner and outer concentric air gap faces, and spacing means between the outer legs of said laminated members providing for substantially the same spacing at any point in the inductor ring.

4. An electrical heating device comprising a primary coil connectable with a source of electrical supply, a secondary circuit forming a heating element, an inductor ring including U-shaped laminated members arranged in circular formation to present continuous circular inner and outer concentric air gap faces, and spacing means between the outer legs of said laminated members, said laminated members having their inner legs wider than their outer legs.

5. In an electrical device, an inductor member having a groove therein, a coil within the lower portion of said groove, and a cover of yielding material for said coil, said inductor member being formed to provide shoulders within the groove and said cover being yieldably positionable below said shoulders to a retained position over said coil.

6. In an electrical heating device, a substantially circular inductor ring having a substantially circular groove, a coil wound within the lower portion of said groove, and a substantially circular cover of yielding material for said coil, said inductor ring being formed to provide shoulders in the groove thereof and said cover being yieldably positionable below said shoulders to a retained position over said coil.

7. In an electrical heating device, having a primary coil connectable with a source of electrical supply, having a magnetic circuit, and having a secondary circuit forming a heating element positionable adjacent said primary coil and magnetic circuit, armature members positioned adjacent said secondary circuit to complete the magnetic circuit, said armature members being of spiral formation.

8. In an electrical heating device, having a primary coil connectable with a source of electrical supply, having a magnetic circuit, and having a secondary circuit forming a heating element positionable adjacent said primary coil and magnetic circuit, armature members positioned adjacent said secondary circuit to complete the magnetic circuit, said armature members being formed of spirally wound metal which has been upset in a die.

9. In an electrical heating device, having a primary coil connectable with a source of electrical supply, having a magnetic circuit, and having a secondary circuit forming a heating element positionable adjacent said primary coil and magnetic circuit, armature members positioned adjacent said secondary circuit to complete the magnetic circuit, said armature members being formed of spirally wound metal which has been upset in a die, the edges of the metal being of greater thickness than the portions therebetween.

10. In an electrical heating device having a primary coil connectable with a source of electrical supply, having a magnetic circuit, and having a member to be heated provided with an extension forming a secondary circuit positionable adjacent said primary coil and magnetic circuit, armatures cast in position in said secondary extension to complete the magnetic circuit.

11. An electrical heating device comprising a primary coil connectable with a source of electrical supply, a magnetic circuit, a member to be heated having an extension forming a secondary circuit positionable adjacent said primary coil and magnetic circuit, armatures cast in position in said secondary extension to complete the magnetic circuit, and secondary circuit separating members cast in said extensions between said armatures.

12. An electrical heating device comprising a primary coil connectable with a source of electrical supply, a magnetic circuit, a member to be heated having an extension forming a secondary circuit removably positionable adjacent said primary coil and magnetic circuit, and magnetic means for balancing the upward thrust of the primary coil on the secondary circuit extension.

13. An electrical heating device comprising a primary coil connectable with a source of electrical supply, a magnetic circuit, a member to be heated having an extension forming a secondary circuit removably positionable adjacent said primary coil and magnetic circuit, and magnetic means in series with the primary coil for opposing the upward thrust of said primary coil on the secondary circuit extension.

14. An electrical heating device comprising a substantially circular inductor ring having a substantially circular groove, a primary coil mounted within the lower portion of said groove, a separable member to be heated having a substantially circular extension forming a secondary circuit positionable within the groove of the inductor ring above the primary coil, armatures carried by said extension, and means in connection with said inductor ring and said member to be heated cooperable to center the circular extension in the groove of the inductor ring to provide substantially uniform circular air gaps.

15. An electrical heating device comprising a substantially circular inductor ring having a substantially circular groove, a primary coil mounted within the lower portion of said groove, a separable member to be heated having a substantially circular extension forming a secondary circuit positionable within the groove of the inductor ring above the primary coil, armatures carried by said extension, means in connection with said inductor ring and said member to be heated cooperable to center the circular extension in the groove of the inductor ring to provide substantially uniform circular air gaps, and magnetic means acting on the centering means of the member to be heated for balancing the upward thrust of the primary coil on the secondary extension.

16. In an electrical heating device, having a primary coil, having a magnetic circuit, and having a member to be heated provided with an extension forming a secondary circuit, a plurality of pads at the base of said extension for supporting said member to be heated.

17. In an electrical device, a primary circuit, a secondary circuit, a plurality of U-shaped laminated members embracing said primary circuit and said secondary circuit, and formed spiral armatures between said U-shaped members.

18. In an electrical heating device, a utensil having an extension within which heat is generated, and a dome extending upwardly within the utensil and in direct contact with the heated extension, said dome having heat radiating ribs in connection therewith.

19. In an electrical heating device, a utensil having an extension within which heat is generated, and a dome extending upwardly within the utensil and in direct contact with the heated extension, said dome having heat radiating ribs in connection therewith and said utensil being formed with a sediment trough surrounding and extending below said dome.

20. In an electrical heating device, a utensil having an extension within which heat is generated, and a heating surface extending upwardly within the utensil above said extension and having a solid portion of substantially greater thickness than the walls of the utensil in direct contact with said extension, said utensil being formed with a sediment trough adjacent to and extending below said heating surface, the heating surface being inclined towards said trough.

21. In an electrical heating device, a substantially circular inductor ring having a substantially circular groove, a coil wound within the lower portion of said groove, a separable member to be heated having a substantially circular extension forming a secondary circuit which extension is positionable in the upper portion of the groove of the inductor ring, said upper portion of the groove having sides provided with a draft to permit easy removal of the secondary extension.

22. An electrically heated utensil comprising a primary coil, a magnetic circuit and a continuous extension on the utensil carrying a secondary circuit, said secondary circuit being confined to said continuous extension.

23. In an electrical heating device having a primary coil connectable with a source of electrical supply, having a magnetic circuit, and having a secondary circuit forming a heating element positionable adjacent said primary coil and magnetic circuit, armature members positioned adjacent said secondary circuit to complete the magnetic circuit, said armature members being formed of spirally wound metal, said metal having edges of greater thickness than portions therebetween, and said armatures being flattened to less thickness at the center than at the ends and having ends upset to provide exact length, draft and curvature.

24. An electrical heating device comprising, a surrounding inductor member having a groove therein, a primary coil mounted within the lower portion of said groove, a separable member to be heated having an extension forming a secondary circuit of substantially the same shape as the surrounding inductor member and positionable within the groove thereof above the primary coil, and means in connection with said inductor member and said member to be heated cooperable to center the extension in the groove of the inductor member to provide substantially uniform air gaps.

25. In a heating device, a utensil having an extension within which heat is generated, and a heating surface extending upwardly within the utensil above said extension and having a solid portion of substantially greater thickness than the walls of the utensil in direct contact with said extension within which the heat is generated.

26. In a heating device, a utensil having an extension within which heat is generated, and a heating surface extending upwardly within the utensil above said extension, said utensil being formed with a sediment trough adjacent to and extending below said heating surface, said trough being separated by an air space from the extension within which the heat is generated.

HAROLD N. SHAW.

DISCLAIMER 2,001,219.—*Harold N. Shaw*, Erie, Pa. HEATING DEVICE. Patent dated May 14, 1935. Disclaimer filed March 7, 1938, by the inventor.
Hereby enters this disclaimer of claim 26 in said specification.
[*Official Gazette March 29, 1938.*]